United States Patent [19]

Neeley

[11] Patent Number: 4,641,287

[45] Date of Patent: Feb. 3, 1987

[54] METHOD FOR LOCATING AN ON-BOTTOM SEISMIC CABLE

[75] Inventor: Walter P. Neeley, Irving, Tex.

[73] Assignee: Mobil Oil Corporation, New York, N.Y.

[21] Appl. No.: 605,089

[22] Filed: Apr. 30, 1984

[51] Int. Cl.⁴ ............................................. G01V 1/38
[52] U.S. Cl. ...................................... 367/19; 367/106
[58] Field of Search ..................... 367/18, 19, 20, 118, 367/130, 106

[56] References Cited

U.S. PATENT DOCUMENTS 4,375,089 2/1983 Thigpen et al. ...................... 367/20
4,446,538 5/1984 Zachariadis ........................... 367/19

Primary Examiner—Nelson Moskowitz
Assistant Examiner—Ian J. Lobo
Attorney, Agent, or Firm—Alexander J. McKillop; Michael G. Gilman; Charles J. Speciale

[57] ABSTRACT

A method for locating an ocean bottom seismic cable is disclosed wherein a series of shots from a seismic pulse generator are fired. The distance to one seismic pulse detector is determined for each shot defining a spherical surface upon which the detector may be located. The intersection of the spherical surfaces determine the exact location of the detector. Depth detectors may be used to eliminate one half of the possible locations for each shot.

1 Claim, 2 Drawing Figures

METHOD FOR LOCATING AN ON-BOTTOM SEISMIC CABLE

BACKGROUND OF THE INVENTION

In present day seismic exploration there are several methods for acquiring data in a marine environment. The most common method is to use a marine vessel to tow a line of seismic acoustic pulse detectors behind a line of acoustic pulse generators. Unfortunately, this type of arrangement does not permit extremely long spacing between the line of acoustic pulse generators and acoustic pulse detectors. In a system where a line of acoustic pulse detectors are towed behind the acoustic pulse generator, reflection data is obtained. Reflection data is that data based upon returning acoustic waves that are reflected back from a subsurface interface or change in density. By extending the spacing between seismic pulse generators and seismic pulse detectors, refraction data may also be obtained. Refraction data is that data based upon acoustic waves that are returning back from the source side of an interface after traveling along the subsurface interface.

A method for acquiring marine seismic data which permits extended spacing between seismic pulse generators and seismic pulse detectors is the use of an on-bottom seismic cable. By extending the spacing between a seismic pulse source or generator and seismic pulse receivers, refraction and reflection data may be obtained.

An on-bottom seismic cable is similar to a streamer cable of seismic pulse detectors such as that towed behind a marine vessel. A streamer cable comprising a plurality of hydrophone groups spaced along its length can be used as an on-bottom cable, with the proper weight added to remove buoyancy. This assures that the streamer will sink and remain fairly stationary despite the ocean-bottom currents. More detailed information concerning the construction of an ocean bottom seismic cable can be found by referring to copending patent applications Ser. Nos. 579,042, 579,042 and 579,043, titled "Strain Member Chassis", "On Bottom Cable Termination" and "Jacketed Cable Section", respectively, all assigned to the present assignee.

Although an ocean bottom cable has a marker buoy at each end, the length of the cable is several miles and much irregular terrain lies between the buoys. As such, the cable will have a depth variance and a variance from a straight line connecting the two marker buoys. The depth of the ocean bottom cable can be indicated by depth detectors which may be spaced along the length of the cable. The actual location of the acoustic pulse detectors is unknown because the deviation from the straight line connecting the buoy locations is not determined and can be as great as several hundred meters.

SUMMARY OF THE INVENTION

The present invention discloses a method for determining the exact position of an ocean bottom seismic cable. A plurality of spaced apart shots are fired from an acoustic pulse source. A response to each of the shots is produced by an acoustic pulse detector on the ocean bottom cable. The travel time of each shot implies a distance between the source and detector. The distance may be used as a radius defining a spherical surface upon which the detector is located. The intersection of the spheres defined by successive shots define a circumference upon which the detector must be located. The intersection of a third sphere with the circumference thus defined produces two distinct possible locations of the detector. Depth detectors are used to control the possibilities and indicate the exact location of the detector.

DESCRIPTION OF THE PREFERRED EMBODIMENT

Figures 1, 2:
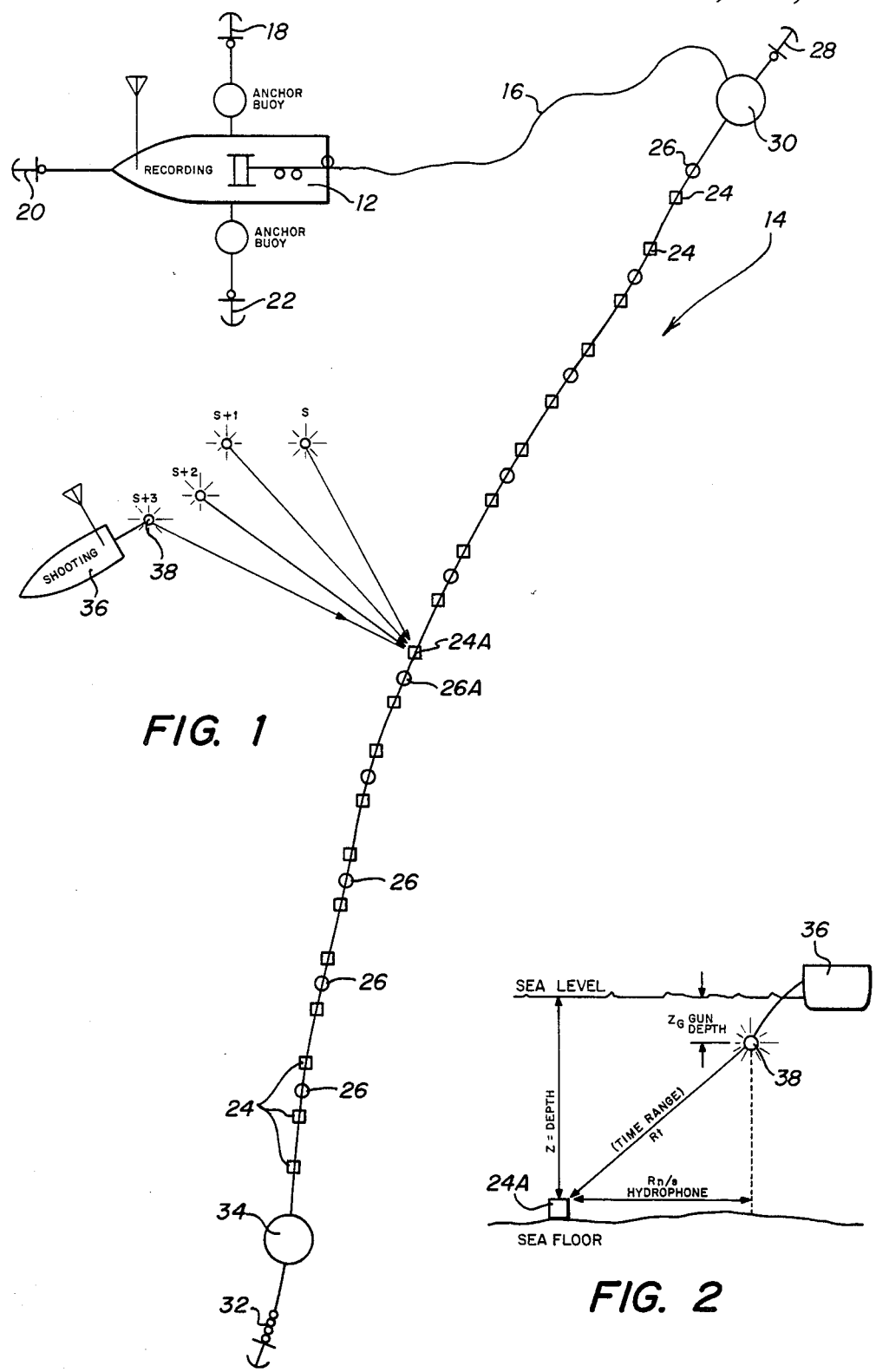
FIG. 1 is a plan view of an ocean bottom seismic cable system.
FIG. 2 is a plan view illustrating location relationships of a portion of FIG. 1.

Referring now to FIG. 1, an ocean bottom cable system for acquiring seismic data is illustrated as having a recording boat 12 connected to an ocean bottom cable 14 through a floating lead-in connection 16. Recording boat 12 is anchored by anchors 18, 20 and 22 to assure that it does not drift and change the position of ocean bottom cable 14. Ocean bottom cable 14 consists of a series of acoustic pulse detectors 24 spaced apart approximately 50 m. In the preferred embodiment, ocean bottom cable 14 is designed for 120 traces, that is, it includes 120 hydrophone groups. Also included on ocean bottom cable 14 are depth detectors 26 which are spaced apart approximately 100 m. Depth detectors 26 may be of any type currently in use in the art and are used to indicate the depth below sea level of that particular portion of ocean bottom cable 14. The portion of ocean bottom cable 14 closest to recording boat 12 is anchored by anchor 28 identified by marker buoy 30. The far end of ocean bottom cable 14 is anchored by anchor 32 identified by marker buoy 34. Located along side of ocean bottom cable 14 is shooting boat 36. Shooting boat 36 is illustrated as having fired an air gun 38 which it is towing at locations S, S+1, S+2, and S+3 to locate the exact position of ocean bottom cable 14.

For simplicity, travel of acoustic pulses from shot location S, shot location S+1, shot location S+2, and shot location S+3 will be discussed only in connection with acoustic pulse detector 24a. Depth detector 26a will provide the depth information for acoustic pulse detector 24a. In operation, the acoustic pulse generated at each one of the shot locations will be received by each acoustic pulse detector on ocean bottom cable 14. Using the location method of the present invention, the position of ocean bottom cable 14 will be determined at the interval of the acoustic pulse detectors.

To locate a portion of ocean bottom cable 14, air gun 38 is fired first at location S, then at location S+1, then at location S+2, and finally at location S+3. The acoustic pulse generated at each of these locations will be detected by acoustic pulse detector 24a which will produce a response thereto indicating the arrival of the acoustic pulse. The arrival time from each of the shot locations will be different. By correlating the travel time with velocity of acoustic pulses in water, a distance may be determined. The distance for each location defines the surface of a sphere as possible locations for acoustic pulse detector 24a. By plotting the sphere for two locations, location S and location S+1, two spheres may be graphed. The only possible location for acoustic pulse detector 24a consistent with spheres determined by the travel time from shot location S and shot location S+1 is a circle defined by the intersection of the two spheres. By graphing a sphere based upon the travel time with its correlated distance for shot location S+2, a third sphere may be graphed. The sphere from shot location S+2 may be plotted against the sphere from shot location S+1 or the sphere from shot location S to provide an additional circle at its intersection. The intersection of the two circles generated by the intersection of two sets of intersecting spheres will produce two possible locations for acoustic pulse detector 24a provided S, S+1 and S+2 locations do not constitute a straight line. By the same token, graphing the sphere from shot location S and the sphere from shot location S+1 and the sphere from shot location S+2 will produce the same two points as possible locations for acoustic pulse detector 24a as the intersection of the two circles defined by the intersecting spheres.

Of the two possible locations for acoustic pulse detector 24a, one will be in the air and inconsistent with the depth indication of depth indicator 26a. Thus, the exact location of acoustic pulse detector 24a maybe determined by the intersection of three spheres generated from three shot locations where acoustic pulse source 38 had been fired and the data received from depth detector 26a.

Referring now to FIG. 2, a side view of the relationship between shooting vessel 36, acoustic pulse source 38 and acoustic pulse detector 24a is illustrated. When acoustic pulse source 38 is fired, acoustic pulse will travel in a straight line to acoustic pulse detector 24a in a given travel time. The distance between acoustic pulse source 38 and acoustic pulse detector 24a may be calculated by multiplying the travel time times the velocity of acoustic pulse in sea water, which is approximately 5 ft./ms. By using the travel time, a distance $R_T$ may be calculated. A depth equal to Z for acoustic pulse detector 24a may be obtained from depth detector 26a. Gun depth, $Z_G$ may be easily obtained from shooting vessel 36 to obtain the distance from acoustic pulse source 38 to the depth of acoustic pulse detector 24a. With this information, and the use of the Pythagorean Theorem, the horizontal distance from acoustic pulse source 38 to acoustic pulse detector 24a may be determined. For a first shot point S, the horizontal distance from acoustic pulse source 38 to acoustic pulse detector 24a may be plotted as a circle. Similarly, a circle may be plotted for a second shot point S+1 and a third shot point S+2. The intersection of these three circles give the location of acoustic pulse detector 24a projected to a horizontal plane defined by sea level.

By use of any of the foregoing methods, the location of ocean bottom cable 14 may be determined with a high degree of accuracy. Merely drawing a straight line between marker buoy 30 and tail buoy 34 does not accurately indicate the location of ocean bottom cable 14. This is due to the uneven terrain of the ocean bottom, the ocean currents and wave action when ocean bottom cable 14 is being laid. The location of ocean bottom cable 14 is essential in acquiring accurate seismic data since the depth of an interface which reflects or refracts seismic data is determined by the travel time from an acoustic pulse source, such as source 38, and acoustic pulse detector, such as detector 24a. Since acoustic pulse detectors 24 may be several hundred meters from a straight line drawn between marker buoy 30 and tail buoy 34, the depth of an interface measured by reflected data may be off by over a hundred meters. Thus, using the method of the present invention, the location of an ocean bottom cable may be determined accurately to provide a greater degree of accuracy in the acquiring of seismic data.

While the present invention has been described by way of preferred embodiment, it is to be understood as not limited thereto but only by the scope of the following claim.

I claim:

1. A method for determining the location of an ocean bottom cable having acoustic pulse detectors comprising the steps of:

firing an acoustic pulse source at a first location;

producing a first response thereto by a first acoustic pulse detector located on the said cable;

determining the distance between said first location and said first acoustic pulse detector, said distance defining a spherical surface;

firing said acoustic pulse source at a second location;

producing a second response thereto by said first acoustic pulse detector;

determining the distance between said second location and said first acoustic pulse detector, said distance defining a spherical surface;

defining a line of possible loctions of said first acoustic pulse detector by the points common to said distance between said first location and said first acoustic pulse detector and to said distance between said second location and said first acoustic pulse detector;

firing said acoustic pulse source at a third location;

producing a third response thereto by said first acoustic pulse detector;

determining the distance between said third location and said first acoustic pulse detector, said distance defining a spherical surface;

identifying two possible locations of said first acoustic pulse detector by the points common to said line of possible locations of said first acoustic pulse detector and said distance between said third location and said first acoustic pulse detector; and eliminating one of said two possible locations as being above sea level;

providing a depth detector in close proximity to said first acoustic pulse detector;

determining the depth of said first acoustic pulse detector; and confirming the location of said first acoustic pulse detector by eliminating locations of said line of possible locations inconsistent with said depth of said first acoustic detector.

* * * * *